Dec. 6, 1960     E. HITZELBERGER     2,962,750
DOOR LOCATING MEANS FOR VEHICLES
Filed Nov. 21, 1955
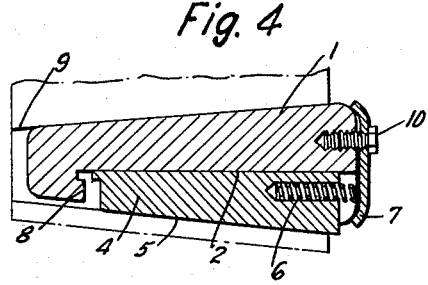
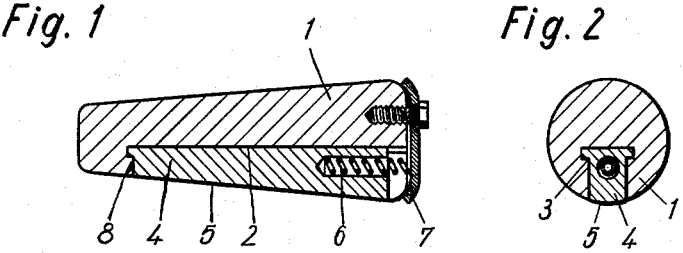 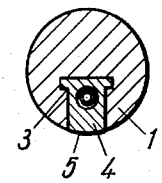
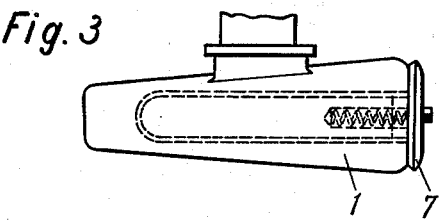
INVENTOR
ERWIN HITZELBERGER
BY *Dicke and Gray*
ATTORNEYS

United States Patent Office 2,962,750
Patented Dec. 6, 1960

2,962,750

DOOR LOCATING MEANS FOR VEHICLES

Erwin Hitzelberger, Stuttgart-Rohr, Germany, assignor to Daimler-Benz Aktiengesellschaft, Stuttgart-Unterturkheim, Germany Filed Nov. 21, 1955, Ser. No. 548,215

Claims priority, application Germany Dec. 2, 1954

5 Claims. (Cl. 16—85)

The present invention relates to door locating means, particularly for vehicles.

The door locating means known prior to this invention consisted of a conical pin and a conical socket which were disposed on the door and the door frame, respectively, and adapted to engage with each other so as to maintain the door in its proper vertical position and relieve the door lock and hinges from unnecessary strain. This type of door locating means had the disadvantage that the cooperating conical surfaces of the pin and socket would soon wear out so that the pin would no longer engage along its entire conical surface within the socket, resulting in rattling of the door during the movement of the vehicle, especially when traveling along rough roads. Various attempts have therefore been made to overcome such rattling of the doors, for example, by providing a rubber cushion at the narrow end of the conical pin or a ring of a suitable plastic at the wider end thereof so as to form an elastic connection between the pin and the socket. However, these attempts to remedy the trouble were only partly successful and these elastic means were only able to prevent the rattling action and its accompanying noise for a limited length of time.

It is an object of the present invention to overcome the disadvantages of door locating means known prior to this invention by providing the conical locating pin with a wedge-shaped member which is adjustable in the axial direction of the conical pin and is urged in one direction by means of a spring. However, when the pin is received in the socket, the wedge-shaped member may be forced in the opposite direction against the pressure of the spring by the pressure of the socket wall upon this member, thus causing a tight engagement of the pin with the socket.

Further objects, features, and advantages of the present invention will be apparent from the following detailed description of one particular embodiment thereof as illustrated in the accompanying drawing, in which:

Fig. 1 shows a longitudinal section through the conical locating pin provided with the tensioning device according to the invention with the parts as disposed when the door is open;

Fig. 2 shows a cross section thereof;

Fig. 3 shows a side view thereof; while

Fig. 4 shows the disposition of the parts of the locating pin when received in a socket.

Referring to the drawing, the conical locating pin 1 is provided in its lower half with an elongated recess 2 having a dovetailed base 3 and terminating at a point 8 near the narrow end of pin 1. A wedge-shaped key 4 is provided with a corresponding dovetailed upper edge and mounted in recess 2 and adapted to slide therein in the axial direction of pin 1. The outer surface 5 of key 4 is inclined longitudinally and peripherally rounded in accordance with the conical shape of pin 1 and socket 9. The latter receives the pin 1 in a general manner shown in Figure 1 of the French patent 1,045,464 to Kiekert.

Key 4 is provided with a socket hole at its wider end in which a coil spring 6 is mounted, the other end of which rests against a coverplate 7 which is secured to pin 1 by a screw 10. The pressure of spring 6 always tends to maintain the narrower end of key 4 in engagement with the end 8 of recess 2, this end constituting an abutment means. This is the position of key 4 when the door is open and pin 1 not in engagement with socket 9. The key 4 then slightly projects from the adjacent outer surface of pin 1 with its outer surface 5 located outside same. When the door is being closed, surface 5 engages with the inner surface of socket 9 and thus secures a tight fit of pin 1 in socket 9. Any excess pressure of surface 5 against the inner wall of socket 9 is taken up by a slight resilient escape of key 4 in the outward direction against the force of spring 6. Even after considerable wear of the respective parts, pin 1 will retain its secure connection with socket 9 and prevent any rattling therein.

Although my invention has been illustrated and described with reference to the preferred embodiment thereof, I wish to have it understood that it is in no way limited to the details of such embodiment or to the specific example described, but is capable of numerous modifications within the scope of the appended claims.

Having thus fully disclosed my invention, what I claim is:

1. A door locating means adapted for cooperation with a conical socket in a door frame, said means comprising a pin member of conical shape adapted to be received within said socket, said pin member being adapted to be mounted on a door and having a recess extending in the direction of the length of the pin member, a wedge-shaped member slidably mounted in said recess, said pin member having an outer surface, and spring means urging said wedge-shaped member toward one end of said recess, said wedge-shaped member projecting radially beyond the said surface of said pin member, abutment means defining the end of said recess, said wedge-shaped member being spaced from said abutment means when said pin member is received in said socket to facilitate compensating movement of said wedge-shaped member preventing relative movement of said door and said frame tending to produce rattle, said wedge-shaped member contacting said abutment means when said door is in open position.

2. A door locating means according to claim 1, wherein the smaller end of said wedge-shaped member is adjacent said abutment means and said wedge-shaped member is slidable in the direction of its length to a position causing tight-fitting engagement between the said pin member of conical shape and said conical socket when said pin member is received in said socket.

3. A door locating means according to claim 1, wherein said pin member and said wedge-shaped member are provided with cooperating dove-tailed portions.

4. A door locating means adapted for cooperation with a conical socket in a door frame, comprising a pin member of conical shape adapted to be received within said socket, said pin member being adapted to be mounted on a door and having a recess therein, a spring pressed wedge member in said recess, said wedge member having an exterior curved surface contacting the wall of said conical socket and providing tight-fitting engagement between said pin member and said socket, abutment means defining the end of said recess, said wedge-shaped member being spaced from said abutment means when said pin member is received in said socket to facilitate compensating movement of said wedge-shaped member consequent upon relative movement of said door and said frame tending to produce rattle, said wedge-shaped member contacting said abutment means when said door is in open position.

5. A door locating means adapted for cooperation with a conical socket in a door frame, said means comprising a pin member of conical shape adapted to be received within said socket, said pin member being adapted to be mounted on a door and having a recess extending in the direction of the length of the pin member, a wedge-shaped member slidably mounted in said recess, said pin member having an outer surface, and spring means urging said wedge-shaped member toward one end of said recess, said wedge-shaped member projecting radially beyond the said surface of said pin member, said spring means including a spring disposed within said wedge-shaped member and a plate secured to said pin member, said spring being in abutting relationship with said plate.

References Cited in the file of this patent

UNITED STATES PATENTS

| | | |
|---|---|---|
| 1,561,726 | Kerr | Nov. 17, 1925 |
| 2,854,272 | Probst | Sept. 30, 1958 |

FOREIGN PATENTS

| | | |
|---|---|---|
| 573,689 | France | Mar. 16, 1924 |
| 1,045,464 | France | June 24, 1953 |